United States Patent
Lei et al.

(10) Patent No.: US 11,337,182 B2
(45) Date of Patent: May 17, 2022

(54) INDICATION FOR A PORTION OF A TIME INTERVAL

(71) Applicant: Motorola Mobility LLC, Chicago, IL (US)

(72) Inventors: Haipeng Lei, Beijing (CN); Chenxi Zhu, Beijing (CN)

(73) Assignee: Motorola Mobility LLC, Chicago, IL (US)

(*) Notice: Subject to any disclaimer, the term of this patent is extended or adjusted under 35 U.S.C. 154(b) by 115 days.

(21) Appl. No.: 16/497,085

(22) PCT Filed: Mar. 24, 2017

(86) PCT No.: PCT/CN2017/078159
§ 371 (c)(1),
(2) Date: Sep. 24, 2019

(87) PCT Pub. No.: WO2018/170915
PCT Pub. Date: Sep. 27, 2018

(65) Prior Publication Data
US 2021/0120537 A1    Apr. 22, 2021

(51) Int. Cl.
*H04W 72/04* (2009.01)
*H04L 1/18* (2006.01)

(52) U.S. Cl.
CPC ....... *H04W 72/0406* (2013.01); *H04L 1/1812* (2013.01); *H04L 1/1819* (2013.01); *H04W 72/0446* (2013.01)

(58) Field of Classification Search
CPC . H04W 72/0446; H04W 84/12; H04W 84/18; H04W 28/04; H04W 28/06; H04W 72/0406; H04L 1/1812; H04L 1/1819
(Continued)

(56) References Cited

U.S. PATENT DOCUMENTS 8,817,734 B2 *   8/2014   Khoryaev ............... H04L 1/189
                                                           370/329
10,616,381 B2 *  4/2020   Moon .................... H04L 1/0009
(Continued)

FOREIGN PATENT DOCUMENTS

CN          102123504 A      7/2011
CN          105765931 A      7/2016
(Continued)

OTHER PUBLICATIONS

3GPP TSG-RAN Meeting #86, Sitges, Spain, Dec. 9-13, 2019, Tdoc RP-192800, Agenda Item: 9.1.1, Source: Ericsson, Title: Views for the WID on enhancement IIoT and URLLC Support. (Year: 2019).*
(Continued)

*Primary Examiner* — Pankaj Kumar
*Assistant Examiner* — Sanjay K Dewan
(74) *Attorney, Agent, or Firm* — Kunzler Bean & Adamson (57) ABSTRACT

Apparatuses, methods, and systems are disclosed for transmitting and/or receiving an indication of a portion of a time interval. One apparatus (200) includes a receiver (212) that: receives (902) a signal in a first transmission time interval indicating associated information of a second transmission time interval, wherein the second transmission time interval is a portion of the first transmission time interval; and receives (904) first data in the first transmission time interval and second data in the second transmission time interval.

20 Claims, 8 Drawing Sheets

(58) Field of Classification Search
USPC .......................................................... 370/336
See application file for complete search history.

(56) References Cited

U.S. PATENT DOCUMENTS

| | | | | |
|---|---|---|---|---|
| 10,667,250 | B2* | 5/2020 | Shimezawa | H04L 27/26 |
| 2013/0250924 | A1* | 9/2013 | Chen | H04L 1/1819 370/336 |
| 2014/0036889 | A1* | 2/2014 | Kim | H04W 72/0446 370/336 |
| 2014/0293843 | A1* | 10/2014 | Papasakellariou | H04L 1/00 370/280 |
| 2014/0328333 | A1* | 11/2014 | Seo | H04L 1/1664 370/336 |
| 2014/0362832 | A1* | 12/2014 | Rudolf | H04L 1/1887 370/336 |
| 2015/0085674 | A1* | 3/2015 | Wu | H04L 1/1812 370/242 |
| 2015/0296518 | A1* | 10/2015 | Yi | H04W 72/042 370/336 |
| 2016/0065341 | A1* | 3/2016 | Yoo | H04W 72/0446 370/336 |
| 2016/0105268 | A1* | 4/2016 | Kim | H04L 1/1861 370/336 |
| 2016/0164643 | A1* | 6/2016 | Loehr | H04L 1/1854 370/336 |
| 2016/0309466 | A1* | 10/2016 | Chen | H04L 5/0035 |
| 2017/0325164 | A1* | 11/2017 | Lee | H04W 76/28 |
| 2017/0374652 | A1* | 12/2017 | Islam | H04W 76/27 |
| 2018/0367265 | A1* | 12/2018 | Wang | H04L 5/0094 |
| 2018/0376497 | A1 | 12/2018 | You et al. | |
| 2019/0020444 | A1* | 1/2019 | Froberg | H04L 1/1896 |
| 2019/0260546 | A1* | 8/2019 | Kilinc | H04L 5/0053 |
| 2019/0327760 | A1* | 10/2019 | Holfeld | H04W 72/04 |
| 2019/0373607 | A1* | 12/2019 | Zhang | H04L 1/1854 |
| 2019/0379491 | A1* | 12/2019 | Kilinc | H04L 1/1896 |
| 2020/0059911 | A1* | 2/2020 | Tang | H04W 24/00 |
| 2020/0220698 | A1* | 7/2020 | Zhang | H04L 5/0044 |
| 2020/0221434 | A1* | 7/2020 | Sun | H04W 72/042 |
| 2021/0212056 | A1* | 7/2021 | Patel | H04L 5/0044 |

FOREIGN PATENT DOCUMENTS

| | | | | |
|---|---|---|---|---|
| WO | 2015180045 | A1 | 12/2015 | |
| WO | WO 2015/180045 | A1 * | 12/2015 | ............ H04W 72/12 |
| WO | WO 2015180045 | A1 * | 12/2015 | ............ H04W 72/12 |
| WO | 2016073138 | A1 | 5/2016 | |
| WO | WO 2016/073138 | A1 * | 5/2016 | ............... H04L 1/18 |
| WO | 2017/018761 | A1 | 2/2017 | |
| WO | WO 2017/01875 | A1 * | 2/2017 | .......... H04W 72/042 |
| WO | WO 2017/018761 | A1 * | 2/2017 | ............... H04L 5/00 |
| WO | 2018/145078 | A1 | 8/2018 | |
| WO | WO 2018/145078 | A1 * | 8/2018 | ............... H04L 1/18 |
| WO | WO 2018/145078 | A1 * | 9/2018 | ............... H04L 1/18 |

OTHER PUBLICATIONS

3GPP TSG RAN WG1 Meeting NR #1, Spokane, USA, Jan. 16-20, 2017, R1-1700959, Agenda Item: 5.1.3.3, Source: Samsung, Title: Discussion on partial retransmission for eMBB. (Year: 2017).*
3GPP TSG RAN WG1 Meeting #88, Athens, Greece, Feb. 13-17, 2017, Source: NTT DOCOMO, Inc., Title: Views on HARQ enhancements for NR, Agenda Item: 8.1.3.3.1. (Year: 2017).*
3GPP TSG RAN WG1 Meeting #88, Athens, Greece, Feb. 13-17, 2017, R1-1702738, Agenda Item: 8.1.3.3.1, Source: MediaTek Inc., Title: On multiple HARQ bits per TB and feedback mechanism. (Year: 2017).*
3GPP TSG RAN WG1 Meeting #88, Athens, Greece, Feb. 13-17, 2017, Agenda Item: 8.1.3.3.1, Source: Samsung, Title: CB-group based retransmission for eMBB. (Year: 2017).*
3GPP TSG RAN WG1 AH_NR Meeting, Spokane, USA, Jan. 16-20, 2017, R1-1700628, Source: NTT DOCOMO, Inc., Title: Mini-slot for latency reduction, Agenda Item: 5.1.4. (Year: 2017).*
3GPP TSG RAN WG1 Meeting #86b, Oct. 10-14, 2016, Lisbon, Portugal, R1-1610007, Agenda item: 7.2.10.2.1, Source: Qualcomm Incorporated, Title: Downlink Design for shortened TTI. (Year: 2016).*
3GPP TSG RAN WG1 Meeting #86, Gothenburg, Sweden, Aug. 22-26, 2016, R1-166148, Agenda Item: 7.2.12.2.1, Source: Huawei, HiSilicon, Title: sPDCCH design for short TTI. (Year: 2016).*
3GPP TSG RAN WG1 Meeting #85, Nanjing, China, May 23-27, 2016, R1-164649, Agenda Item: 6.2.10.1, Source: Lenovo, Title : Design for DL channels for shortened TTI. (Year: 2016).*
3GPP TSG RAN WG1 Meeting #87, Reno, USA Nov. 14-18, 2016, R1-1611777, Agenda item: 6.2.10.2.4, Source: LG Electronics, Title: Discussions on sPDSCH and DMRS design. (Year: 2016).*
Europen Patent Office, "Extended European Search Report", dated Oct. 14, 2020, pp. 1-10.
Samsung, "Discussion on partial retransmission for eMBB", 3GPP TSG RAN WG1 Meeting NR#1 R1-1700959, Jan. 16-20, 2017, pp. 1-4.
PCT/CN2017/078159, Notification of Transmittal of the International Search Report and the Written Opinion of the International Searching Authority, or the Declaration, PCT, dated Nov. 30, 2017, pp. 1-11.
NTT DOCOMO, Inc. "Mini-slot for latency reduction", 3GPP TSG RAN WG1 AH_NR Meeting R1-1700628, Jan. 16-20, 2017, pp. 1-7.
Samsung, "CB-group based retransmission for eMBB", 3GPP TSG RAN WG1 Meeting #88 R1-1702990, Feb. 13-17, 2017, pp. 1-9.
3GPP, "3rd Generation Partnership Project; Technical Specification Group Radio Access Network; Evolved Universal Terrestrial Radio Access (E-UTRA); Multiplexing and channel coding (Release 15)", 3GPP TS 36.212 V15.2.1, Jul. 2018, p. s1-245.
Mediatek Inc., "On multiple HARQ bits per TB and feedback mechanism", 3GPP TSG RAN WG1 Meeting #88 R1-1702738, Feb. 13-17, 2017, pp. 1-4.
NTT DOCOMO, Inc., "Views on HARQ enhancements for NR", 3GPP TSG RAN WG1 Meeting #88 R1-1702815, Feb. 13-17, 2017, pp. 1-4.

* cited by examiner

INDICATION FOR A PORTION OF A TIME INTERVAL

FIELD

The subject matter disclosed herein relates generally to wireless communications and more particularly relates to an indication for a portion of a time interval.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, a high carrier frequency (e.g., >6 GHz) may be used, such as millimeter wave. In some networks, DL TBs may be carried on a PDSCH. In various configurations, a maximum of two TBs may be transmitted on a PDSCH in one serving cell and in one subframe. In such configurations, HARQ-ACK feedback bits corresponding to a PDSCH may be transmitted either on a PUCCH or on a PUSCH.

In some network configurations, an internal interleaver for turbo coding may have a limited number of code block sizes. In various configurations, the maximum code block size is 6144 in certain turbo decoders. In certain networks, if a transport block, including a transport block level cyclic redundancy check ("CRC"), has a bit length larger than the maximum code block size, then a procedure of code block segmentation may be applied before the bits are fed into a turbo coder. For code block segmentation, the transport block may be segmented into several code blocks so that each code block size is smaller or equal to a limit, and the size of each code block may match a set of specified code block sizes supported by a turbo encoder.

In certain network configurations, during the code block segmentation procedure, a code block level CRC of 24 bits may be calculated for and appended to each code block. Each code block may be decoded independently. The benefit of having a code block level CRC enables early detection of correctly decoded code blocks and correspondingly early stop of the iterative decoding of that code block. This may be used to reduce the terminal processing effort and corresponding energy consumption.

In some network configurations, for a transport block having multiple code blocks, if all the code blocks of the transport block are correctly decoded, the transport block may be seen as a correctly decoded TB and the corresponding HARQ-ACK feedback may be set to ACK; otherwise, the transport block may be seen as an incorrectly decoded TB and the corresponding HARQ-ACK feedback may be set to NACK even though there may be only one code block that is incorrectly decoded. If a NACK is reported from the receiver to the transmitter, the transmitter may retransmit the entire TB (e.g., all the code blocks of the TB) regardless of the successful decoding of some code blocks. This may lead to significant performance degradation due to a number of resources used for retransmission. In various configurations, more severe performance degradation may occur due to larger transport block sizes and burst interference when eMBB transmission is pre-empted by or collides with URLLC.

However, if one HARQ-ACK bit corresponds to one code block, too much feedback overhead may be used. To reduce HARQ-ACK feedback overhead, for one TB, multiple code blocks may be grouped into one code block group ("CBG") and a single bit HARQ-ACK feedback may be used to correspond to the code block group by performing HARQ-ACK bundling (e.g., logic AND operation) on the HARQ-ACK bits corresponding to each code block of the code block group. So, a number of resulting HARQ-ACK bits for one transport block may be equal to a number of code block groups. With a single HARQ-ACK bit feedback for each code block group, a successfully decoded code block group may not be retransmitted in the following HARQ retransmission because the code block group is already successfully decoded at the receiver side. Accordingly, certain retransmissions may use fewer resources and improve resource utilization efficiency.

In some configurations, a UE and a gNB may synchronize their knowledge of a used code block group size. For example, a code block group size may be dynamically indicated by a gNB to a UE via level 1 signaling from an RRC configured set of possible code block group sizes. Accordingly, a single HARQ-ACK bit per code block group may be generated and a number of HARQ-ACK bits may be adjusted flexibly. When retransmitting data based on the HARQ-ACK bits, the retransmitted data may not occupy an entire slot and therefore resources may be wasted.

BRIEF SUMMARY

Apparatuses for transmitting and/or receiving an indication of a portion of a time interval are disclosed. Methods and systems also perform the functions of the apparatus. In one embodiment, the apparatus includes a receiver that: receives a signal in a first transmission time interval indicating associated information of a second transmission time interval, wherein the second transmission time interval is a portion of the first transmission time interval; and receives first data in the first transmission time interval and second data in the second transmission time interval.

In one embodiment, the receiver further receives a first control channel in the first transmission time interval for indicating associated information for the first data and a second control channel in the second transmission time interval for indicating associated information for the second data. In a further embodiment, the receiver further receives a control channel in the first transmission time interval for indicating associated information for the first data and the second data. In certain embodiments, the first data is a partial retransmission of a previous transmission and the second data is a new transmission. In various embodiments, the first data is a new transmission and the second data is a partial retransmission of a previous transmission. In some embodiments, the signal is included in a control channel in a beginning of the first transmission time interval. In one embodiment, the signal is included in a control channel for indicating associated information for the first data.

In certain embodiments, the signal indicates a starting position of the second transmission time interval. In some embodiments, the signal includes multiple bits that indicate a starting symbol of the second transmission time interval. In one embodiment, the signal includes a bitmap to indicates the starting symbol of the second transmission time interval. In various embodiments, the signal indicates an aggregation level, a number of blind decoding candidates for each aggregation level, a set of control channel elements for each aggregation level, a time duration of a region comprising the second control channel, a control resource set index, a starting control channel element index, a starting resource element group index, a numerology, or some combination thereof for detection of a second control channel in the second transmission time interval for indicating associated information for the second data.

A method for receiving an indication of a portion of a time interval, in one embodiment, includes receiving a signal in a first transmission time interval indicating associated information of a second transmission time interval, wherein the second transmission time interval is a portion of the first transmission time interval. In certain embodiments, the method includes receiving first data in the first transmission time interval and second data in the second transmission time interval.

In one embodiment, an apparatus includes a transmitter that transmits a signal in a first transmission time interval to indicate associated information of a second transmission time interval, wherein first data is transmitted in the first transmission time interval and second data is transmitted in the second transmission time interval and the second transmission time interval is a portion of the first transmission time interval.

In one embodiment, the first transmission time interval includes a first control channel for indicating associated information for the first data and the second transmission time interval includes a second control channel for indicating associated information for the second data. In a further embodiment, the first transmission time interval includes a control channel for indicating associated information for the first data transmission and the second data transmission. In certain embodiments, the first data and the second data are transmitted to a same receiver. In some embodiments, the first data is a partial retransmission of a previous transmission and the second data is a new transmission. In one embodiment, the first data is a new transmission and the second data is a partial retransmission of a previous transmission.

In some embodiments, the signal is included in a control channel in a beginning of the first transmission time interval. In certain embodiments, the signal is included in a control channel for indicating associated information for the first data. In various embodiments, the signal indicates a starting position of the second transmission time interval. In one embodiment, the signal includes multiple bits that indicate a starting symbol of the second transmission time interval. In some embodiments, the signal includes a bitmap to indicates the starting symbol of the second transmission time interval. In certain embodiments, the signal indicates an aggregation level, a number of blind decoding candidates for each aggregation level, a set of control channel elements for each aggregation level, a time duration of a region comprising the second control channel, a control resource set index, a starting control channel element index, a starting resource element group index, a numerology, or some combination thereof for detection of a second control channel in the second transmission time interval for the second data.

A method for transmitting an indication of a portion of a time interval, in one embodiment, includes transmitting a signal in a first transmission time interval to indicate associated information of a second transmission time interval, wherein first data is transmitted in the first transmission time interval and second data is transmitted in the second transmission time interval and the second transmission time interval is a portion of the first transmission time interval.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
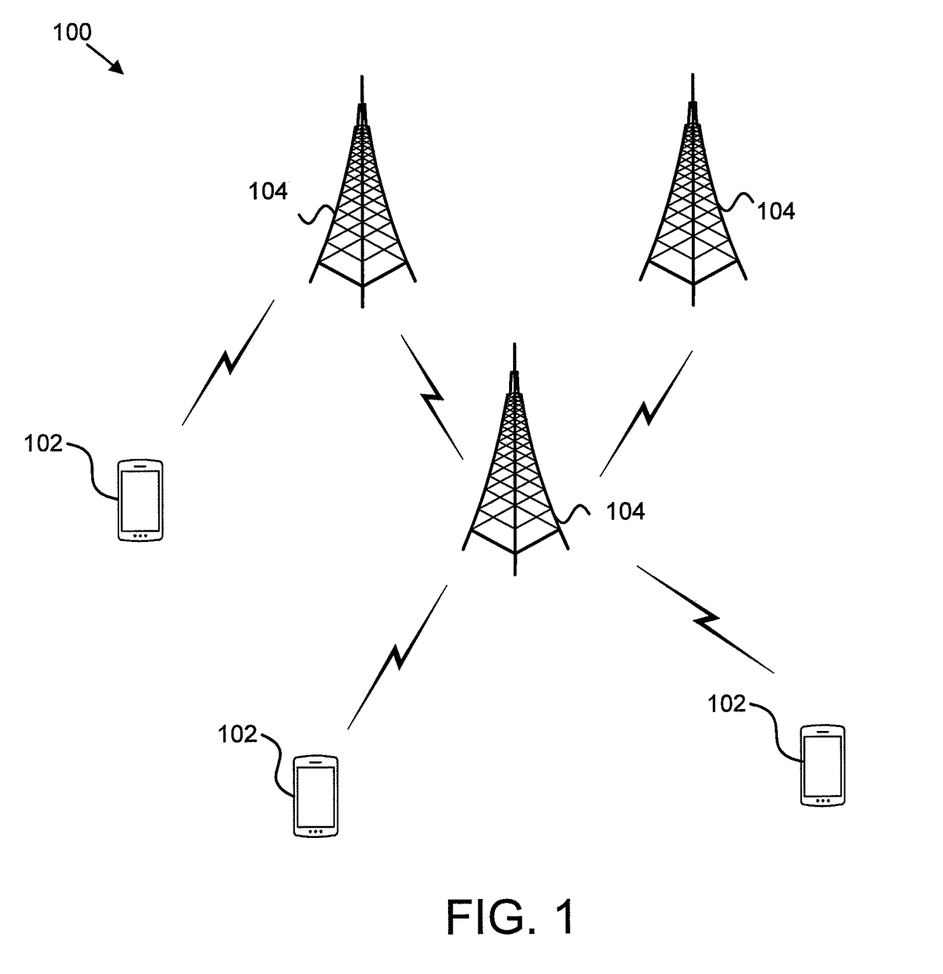
FIG. 1 is a schematic block diagram illustrating one embodiment of a wireless communication system for transmitting and/or receiving an indication of a portion of a time interval.

FIG. 1 depicts an embodiment of a wireless communication system 100 for transmitting and/or receiving an indication of a portion of a time interval. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may receive a signal in a first transmission time interval indicating associated information of a second transmission time interval, wherein the second transmission time interval is a portion of the first transmission time interval. In certain embodiments, the remote unit 102 may receive first data in the first transmission time interval and second data in the second transmission time interval. Accordingly, a remote unit 102 may be used for receiving an indication of a portion of a time interval. As used herein, one transmission time interval may be a duration that corresponds to a number of consecutive symbols in a time domain. In some embodiments, one transmission time interval may be a scheduling unit for one transmission of one TB. In various embodiments, one transmission time interval may be a slot, a mini-slot, or a subframe. In certain embodiments, the duration of one transmission time interval may be different when using different numerologies (e.g., configurations).

In certain embodiments, a base unit 104 may transmit a signal in a first transmission time interval to indicate associated information of a second transmission time interval, wherein first data is transmitted in the first transmission time interval and second data is transmitted in the second transmission time interval and the second transmission time interval is a portion of the first transmission time interval. Accordingly, a base unit 104 may be used for transmitting an indication of a portion of a time interval.

Figure 2:
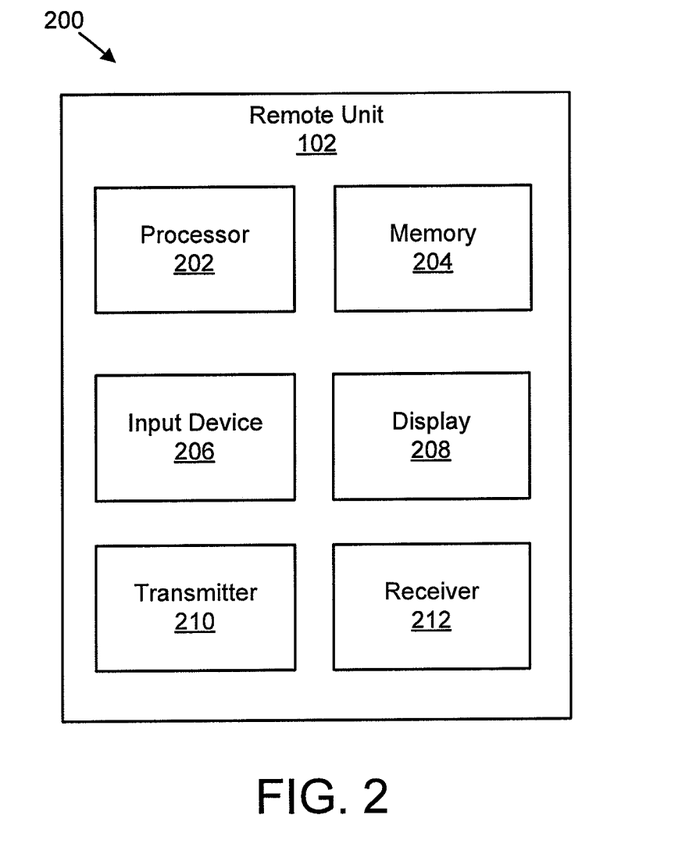
FIG. 2 is a schematic block diagram illustrating one embodiment of an apparatus that may be used for receiving an indication of a portion of a time interval.

FIG. 2 depicts one embodiment of an apparatus 200 that may be used for receiving an indication of a portion of a time interval. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to time intervals. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In certain embodiments, the receiver 212 may be used to receive a signal in a first transmission time interval indicating associated information of a second transmission time interval, wherein the second transmission time interval is a portion of the first transmission time interval. In certain embodiments, the receiver 212 may be used to receive first data in the first transmission time interval and second data in the second transmission time interval. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
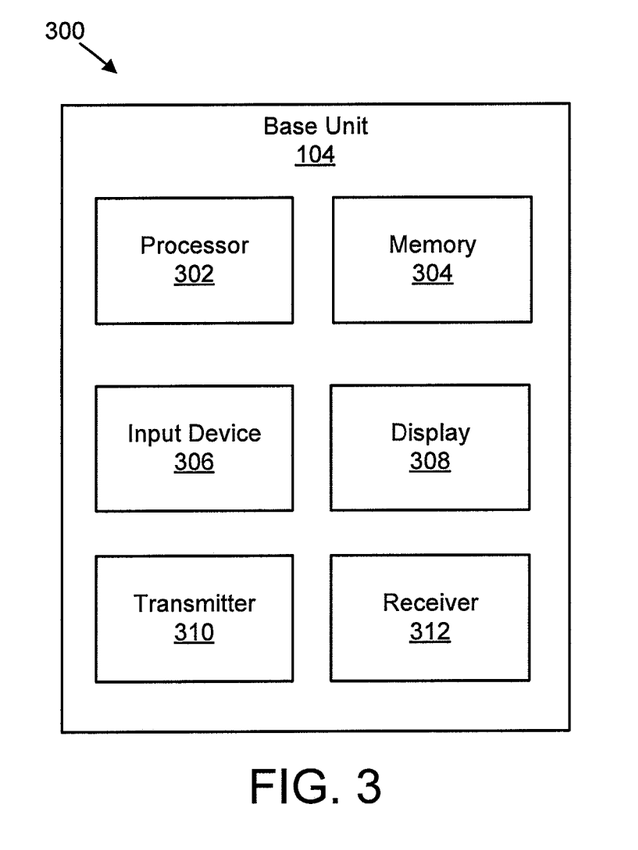
FIG. 3 is a schematic block diagram illustrating one embodiment of an apparatus that may be used for transmitting an indication of a portion of a time interval.

FIG. 3 depicts one embodiment of an apparatus 300 that may be used for transmitting an indication of a portion of a time interval. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit a signal in a first transmission time interval to indicate associated information of a second transmission time interval, wherein first data is transmitted in the first transmission time interval and second data is transmitted in the second transmission time interval and the second transmission time interval is a portion of the first transmission time interval. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
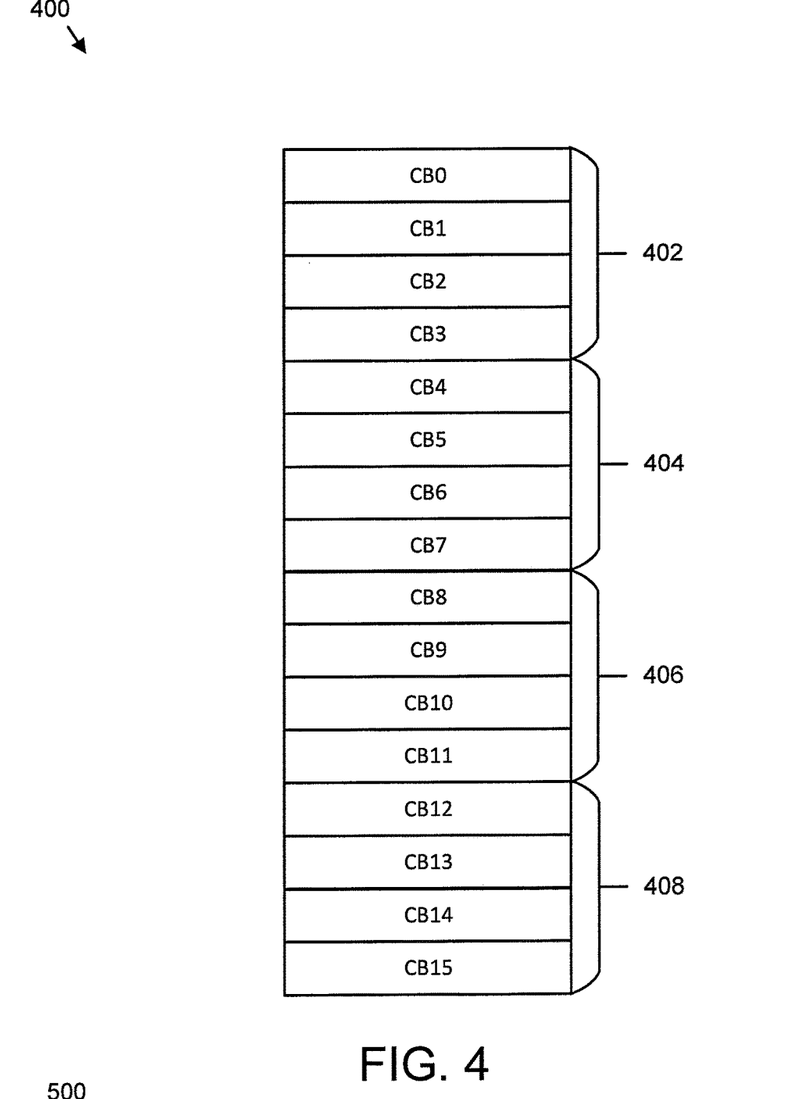
FIG. 4 illustrates one embodiment of a transport block.

FIG. 4 illustrates one embodiment of a transport block 400. The transport block 400 includes code blocks CB0, CB1, CB2, CB3, CB4, CB5, CB6, CB7, CB8, CB9, CB10, CB11, CB12, CB13, CB14, and CB15 (e.g., 16 code blocks). In certain embodiments, the code blocks CB0, CB1, CB2, CB3, CB4, CB5, CB6, CB7, CB8, CB9, CB10, CB11, CB12, CB13, CB14, and CB15 may be grouped into code block groups ("CBGs"). In some embodiments, a first code block group 402 includes CB0, CB1, CB2, and CB3, a second code block group 404 includes CB4, CB5, CB6, and CB7, a third code block group 406 includes CB8, CB9, CB10, and CB11, and a fourth code block group 408 includes CB12, CB13, CB14, and CB15.

Figure 5:
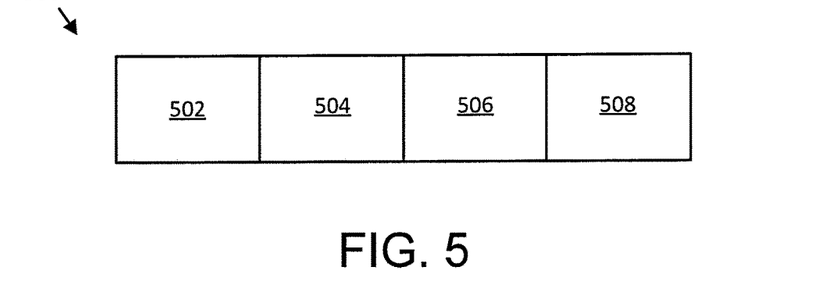
FIG. 5 illustrates one embodiment of feedback corresponding to a transport block.

In certain embodiments, to facilitate CBG-based transmission or retransmission, a base unit 104 and a remote unit 102 may synchronize a knowledge of a CBG size (e.g., a number of code blocks within one code block group). In some embodiments, the CBG size may be set to a minimum of one CB and a maximum of an entire TB. As illustrated in FIG. 4, the CBG size may be four CBs. Based on the knowledge of CBG size, a remote unit 102 may form the CBGs and generate a single HARQ-ACK bit for each CBG by HARQ-ACK bundling within the CBG as one example is illustrated in FIG. 5. In various embodiments, a number of resulting HARQ-ACK feedback bits for one TB may be equal to the number of code block groups. As illustrated in FIG. 4, every four consecutive code blocks form one code block group which is mapped to one HARQ-ACK bit as illustrated in FIG. 5.

FIG. 5 illustrates one embodiment of feedback 500 corresponding to a transport block. The feedback 500 includes four HARQ-ACK bits (e.g., a first bit 502, a second bit 504, a third bit 506, and a fourth bit 508). In certain embodiments, the first bit 502 corresponds to a first code block group (e.g., code block group 402), the second bit 504 corresponds to a second code block group (e.g., code block group 404), the third bit 506 corresponds to a third code block group (e.g., code block group 406), and the fourth bit 508 corresponds to a fourth code block group (e.g., code block group 408). At a remote unit 102, after generating a HARQ-ACK bit corresponding to each CBG, the remote unit 102 may report the HARQ-ACK bits to a base unit 104. The HARQ-ACK bits may be reported in an ascending order of CBG index. In certain embodiments, retransmission of a code block group (e.g., the second code block group 404) may need ¼ of the time-frequency resource allocated for initial transmission of the entire TB. Accordingly, in the slot for retransmission of the TB, the remaining time-frequency resources may be allocated for other remote units 102 as illustrated in FIG. 6.

Figure 6:
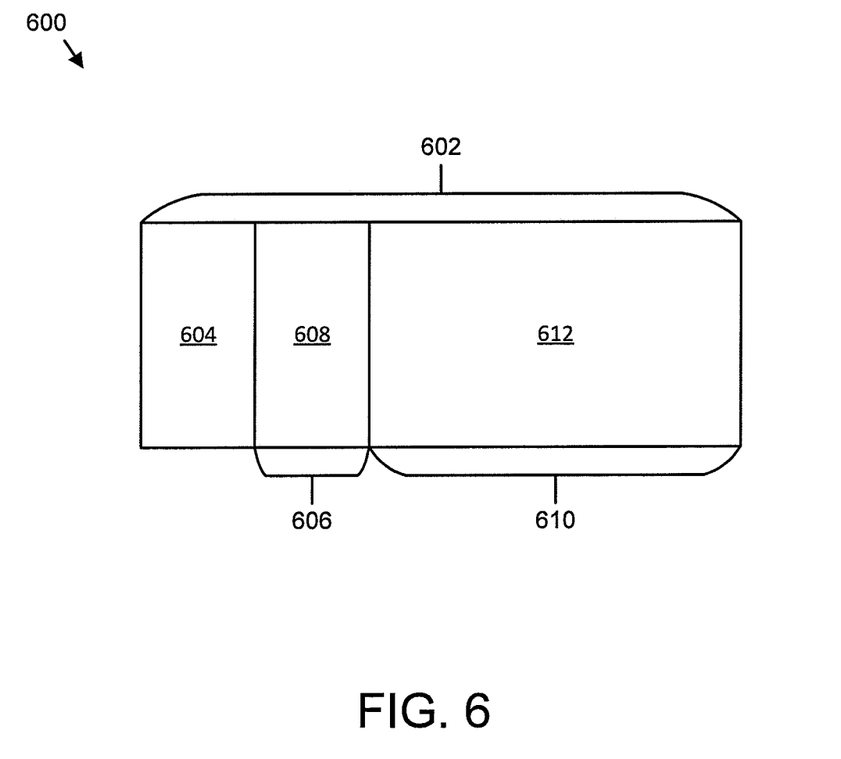
FIG. 6 is a schematic block diagram illustrating one embodiment of communication including mini-slots within a slot.

FIG. 6 is a schematic block diagram illustrating one embodiment of communication 600 including mini-slots within a slot. Specifically, a slot 602 is illustrated including PDCCH 604 at the beginning of the slot 602. The slot 602 includes a first mini-slot 606 which includes a retransmission 608 of one or more failed CBGs. Furthermore, the slot 602 includes a second mini-slot 610 which includes an initial transmission 612 of a new TB.

In certain embodiments, a mini-slot may start at any OFDM symbol and its duration may have a minimum of one symbol and a maximum of y−1 symbols, where y is the number of symbols in one slot and may be equal to 7 or 14. In various embodiments, to improve resource utilization efficiency and peak data rate of one remote unit 102, a base unit 104 may firstly schedule the retransmission of one or more failed CBGs in the beginning of a slot in a granularity of mini-slot (e.g., the first mini-slot 606) and then schedule an initial transmission of a new TB for the same remote unit 102 in the remaining part of the same slot as another mini-slot (e.g., the second mini-slot 610). In some embodiments, the two mini-slots may have a different number of OFDM symbols. In various embodiments, different HARQ process numbers may be used to differentiate different HARQ processes. By using mini-slots, there may be multiple benefits, such as that the failed CBGs may be transmitted faster to improve a user experienced throughput and that a peak data rate may be improved due to the remaining time-frequency resource (e.g., ¾ time-frequency resource) being used for the transmission of a new TB. In certain embodiments, one or more failed CBGs are retransmitted in a mini-slot with a same HARQ process ID to the previous transmission. In such embodiments, a remaining part of the slot is scheduled for the remote unit 102 for new TB transmission also in a mini-slot. In various embodiments, from the point of a previous TB's view, a transmission delay may be reduced, and from the point of the remote unit's view, a peak data rate may be improved. This is especially true for a CBG-based retransmission because the allocated time-frequency resource for retransmission is less and less and mini-slot level scheduling is more suitable for retransmission of failed code blocks and more resource may be scheduled for new TB transmission.

In some embodiments, there may be PDCCH in the beginning of a mini-slot which is used for scheduling the data transmission in the mini-slot. In various embodiments, one or more PDCCHs in the first one or two symbols of a slot may be used to schedule a retransmission of one or more failed CBGs of a previous TB and to schedule an initial transmission of a new TB, respectively. In certain embodiments, the retransmission of one or more failed CBGs of a previous TB and initial transmission of a new TB may be scheduled by the PDCCHs in the beginning of two mini-slots. In such embodiments, the remote unit 102 may blind detect the PDCCH in a mini-slot level. In some embodiments, due to the flexibility of a mini-slot, the mini-slot may start at any OFDM symbol within a slot so that the remote unit 102 may do blind detection in each symbol of the slot to try to find the PDCCH. In certain embodiments, because slot-level scheduling may be used, a remote unit 102 may perform blind detection only in the first one or two symbols carrying slot-level PDCCH. In various embodiments, because of possible mini-slot level scheduling in a same slot, a remote unit 102 may perform PDCCH blind detection in slot-level and more PDCCH blind detection in mini-slot level, possibly starting at each of the remaining symbols. As may be appreciated, blind detection may take up considerable resources of the remote unit 102. If multiple PDCCHs in the beginning of a slot (e.g., first one or two symbols) are used to schedule the partial retransmission of previous TB and initial transmission of a new TB, the capacity of PDCCH may be an issue, especially when multiple partial retransmissions of previous TBs and initial transmission of a new TB are in a same slot.

In some embodiments, for a given remote unit 102, signaling for indicating the concrete position of the mini-slot may be dynamically and explicitly included in the PDCCH at the beginning of a slot (e.g., slot-level PDCCH). As may be appreciated, explicitly indicating the concrete position of a mini-slot may save a remote unit's blind detection effort because a mini-slot may start at any symbol. To be specific, embodiments described in FIG. 7 and FIG. 8 may be used to facilitate indicating the concrete position of a mini-slot.

Figure 7:
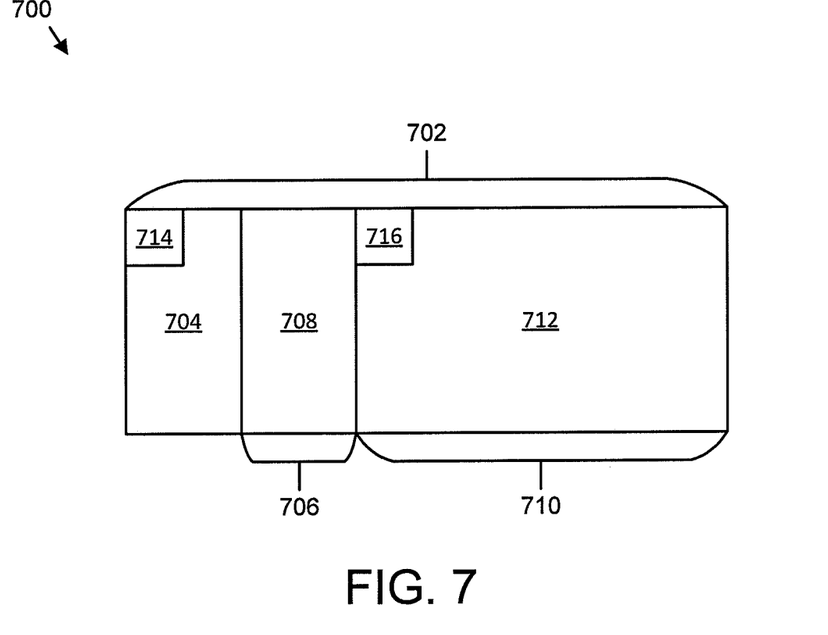
FIG. 7 is a schematic block diagram illustrating one embodiment of communication including an indication of a mini-slot within a slot.

FIG. 7 is a schematic block diagram illustrating one embodiment of communication 700 including an indication of a mini-slot within a slot. Specifically, a slot 702 is illustrated including PDCCH 704 at the beginning of the slot 702. The slot 702 includes a first mini-slot 706 which includes a retransmission 708 of one or more failed CBGs. Furthermore, the slot 702 includes a second mini-slot 710 which includes an initial transmission 712 of a new TB. In certain embodiments, a slot-level PDCCH 714 is used to schedule the partial retransmission 708 of one or more failed CBGs of a previous TB (e.g., TB n) and a mini-slot level PDCCH 716 is used to schedule the initial transmission 712 of a new TB (e.g., TB n+1). Therefore, the signaling for indicating the concrete position of the mini-slot carrying initial transmission of TB n+1 may be dynamically and explicitly included in the slot-level PDCCH 714 for scheduling the partial retransmission 708 of the one or more failed CBGs of TB n.

Figure 8:
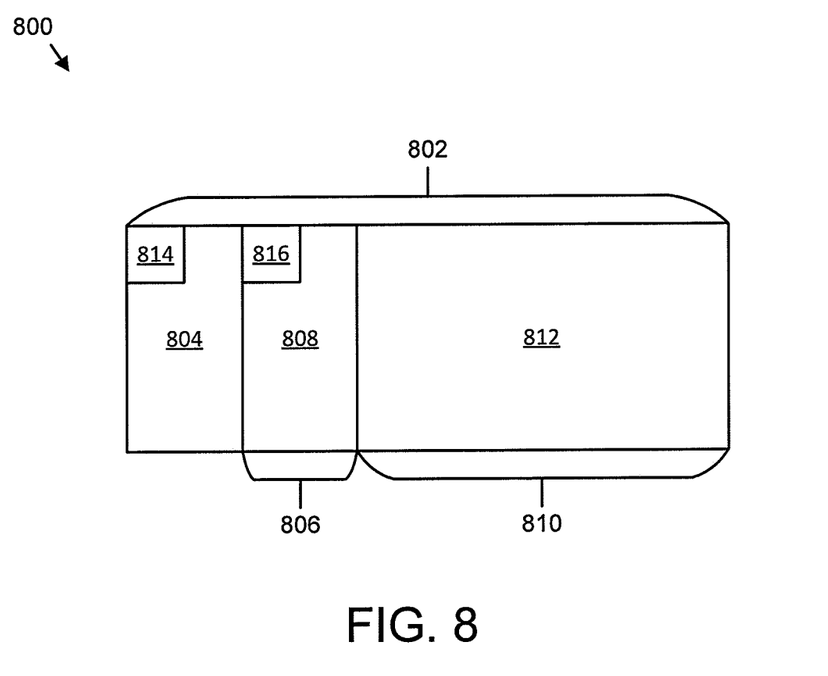
FIG. 8 is a schematic block diagram illustrating another embodiment of communication including an indication of a mini-slot within a slot.

FIG. 8 is a schematic block diagram illustrating another embodiment of an indication of communication 800 including a mini-slot within a slot. Specifically, a slot 802 is illustrated including PDCCH 804 at the beginning of the slot 802. The slot 802 includes a first mini-slot 806 which includes a retransmission 808 of one or more failed CBGs. Furthermore, the slot 802 includes a second mini-slot 810 which includes an initial transmission 812 of a new TB. In various embodiments, a slot-level PDCCH 814 is used to schedule the initial transmission 812 of a new TB (e.g., TB n+1) and a mini-slot level PDCCH 816 is used to schedule the partial retransmission 808 of one or more failed CBGs of a previous TB (e.g., TB n). Therefore, the signaling for indicating the concrete position of the mini-slot carrying partial retransmission 808 of the one or more failed CBGs of TB n may be dynamically and explicitly included in the slot-level PDCCH 814 for scheduling the initial transmission of TB n+1.

In some embodiments, three bits in the slot-level PDCCH 814 (or slot-level PDCCH 714) are used to indicate the determined position of the mini-slot, which may be enough to accommodate any symbol position because the slot may include seven OFDM symbols. In certain embodiments, one value for the three bits may be reserved for indicating that there is no mini-slot scheduled in the current slot.

In various embodiments, a bitmap in the slot-level PDCCH 814 (or slot-level PDCCH 714) is used to indicate one or multiple positions of mini-slots. In some embodiments, a length of the bitmap may accommodate any symbol position. In certain embodiments, because the initial transmission of TB n+1 occupies remaining resources after the partial retransmission of TB n, four bits may be enough to flexibly indicate the possible positions of a mini-slot or multiple mini-slots when there are more than one retransmissions at a mini-slot level scheduled in one slot.

In one embodiment, at a base unit 104, in response to the base unit 104 determining to schedule the retransmission of the one or more failed CBGs of TB n by the slot level PDCCH 814 (or slot-level PDCCH 714) and the initial transmission of TB n+1 by the mini-slot level PDCCH 816 (or mini-slot-level PDCCH 716) (or vice versa) in one slot, the base unit 104 may indicate the starting and ending symbols in the two PDCCHs for the associated two PDSCHs. In certain embodiments, signaling (e.g., three bits or a bitmap) may be included in the slot-level PDCCH 814 (or slot-level PDCCH 714) for indicating the determined position of the mini-slot.

In some embodiments, at a remote unit 102, the remote unit 102 may attempt to detect the slot-level PDCCH 814 (or slot-level PDCCH 714) in the first one or two symbols in one slot. If the slot-level PDCCH 814 (or slot-level PDCCH 714) is successfully detected, the remote unit 102 may obtain the corresponding scheduling information (e.g., the remote unit 102 may know the ongoing PDSCH transmission is a retransmission or an initial transmission by a new data indicator ("NDI") and the time-frequency resource), and detect the signaling for indicating the position of mini-slot scheduling. If such mini-slot scheduling is detected, the remote unit 102 may detect the mini-slot level PDCCH 816 (or mini-slot-level PDCCH 716) in the beginning of the indicated mini-slot for another scheduling; otherwise, the remote unit 102 may not detect any mini-slot in a current slot.

In various embodiments, the signaling in a slot-level PDCCH may indicate information of a mini-slot level PDCCH search space besides the position of the mini-slot to further reduce a remote unit's blind detection effort on searching for PDCCH within the mini-slot.

In certain embodiments, a PDCCH search space may include: an aggregation level, a number of blind decoding candidates for each aggregation level, a set of control channel elements ("CCEs") for each aggregation level, and/or a time duration of a PDCCH region. In some embodiments, a number of blind decoding candidates for each aggregation level may be specified in a specification, therefore such information may not be needed with the knowledge of an aggregation level. In various embodiments, possible aggregation levels may include 1, 2, 4 and 8. In such embodiments, two bits may be enough to indicate which kind of aggregation level is used. In certain embodiments, a time duration of a PDCCH region may be the number of symbols for the PDCCH in a time domain. Because of the characteristic of a mini-slot, PDCCH may have one or two symbols in the time domain. Accordingly, 1 bit may be enough to indicate the time duration of a PDCCH region. In some embodiments, for a set of CCEs for each aggregation level, an exact number of resource element groups ("REGs") for each aggregation level may be known because an aggregation level is the number of CCEs and the number of REGs in one CCE may be fixed in a specification. In some embodiments, for localized mapping, based on a starting REG index and a knowledge of an aggregation level, a set of CCEs for PDCCH search space may be known. In various embodiments, for distributed mapping, with a knowledge of a starting REG index and an aggregation level, there may be insufficient information to know all of the CCEs in the search space. In such embodiments, RRC signaling may be used to configure a set of possible control resource sets then level 1 signaling in a slot-level PDCCH may be used to dynamically indicate which control resource set is used.

In some embodiments, information for indicating a mini-slot level PDCCH search space may be included in a slot-level PDCCH in addition to information for indicating a concrete position of the mini-slot. In one embodiment, the information may include: an aggregation level (e.g., 1, 2, 4, or 8) indicated by two bits; a time duration of the PDCCH region (e.g., 1 or 2 symbols) may be indicated by one bit; and/or a control resource set index in a frequency domain (e.g., a number of bits for the control resource set index may depend on the number of possible control resource sets configured by RRC signaling).

In another embodiment, the information may include: an aggregation level (e.g., 1, 2, 4, or 8) indicated by two bits; a time duration of the PDCCH region (e.g., 1 or 2 symbols) may be indicated by one bit; and/or a starting REG/CCE index for a mini-slot PDCCH search space may be implicitly derived from the starting REG/CCE index of the slot-level PDCCH by a predefined linkage relationship. For example, a starting REG/CCE index for the mini-slot PDCCH search space may be the same as that of the slot-level PDCCH. Accordingly, there may be no signaling overhead for a starting REG/CCE index.

In a further embodiment, the information may include: an aggregation level (e.g., 1, 2, 4, or 8) indicated by two bits; a time duration of the PDCCH region (e.g., 1 or 2 symbols) may be indicated by one bit; and/or a starting REG index for the search space (e.g., a number of bits for the starting REG index may depend on a carrier bandwidth or a number of possible starting REG indexes configured by RRC signaling).

By using the various embodiments described herein, there may be scheduling flexibility and increased utilization of a radio resource of one slot. Furthermore, a remote unit's effort on possible mini-slot blind detection may be reduced.

Figure 9:
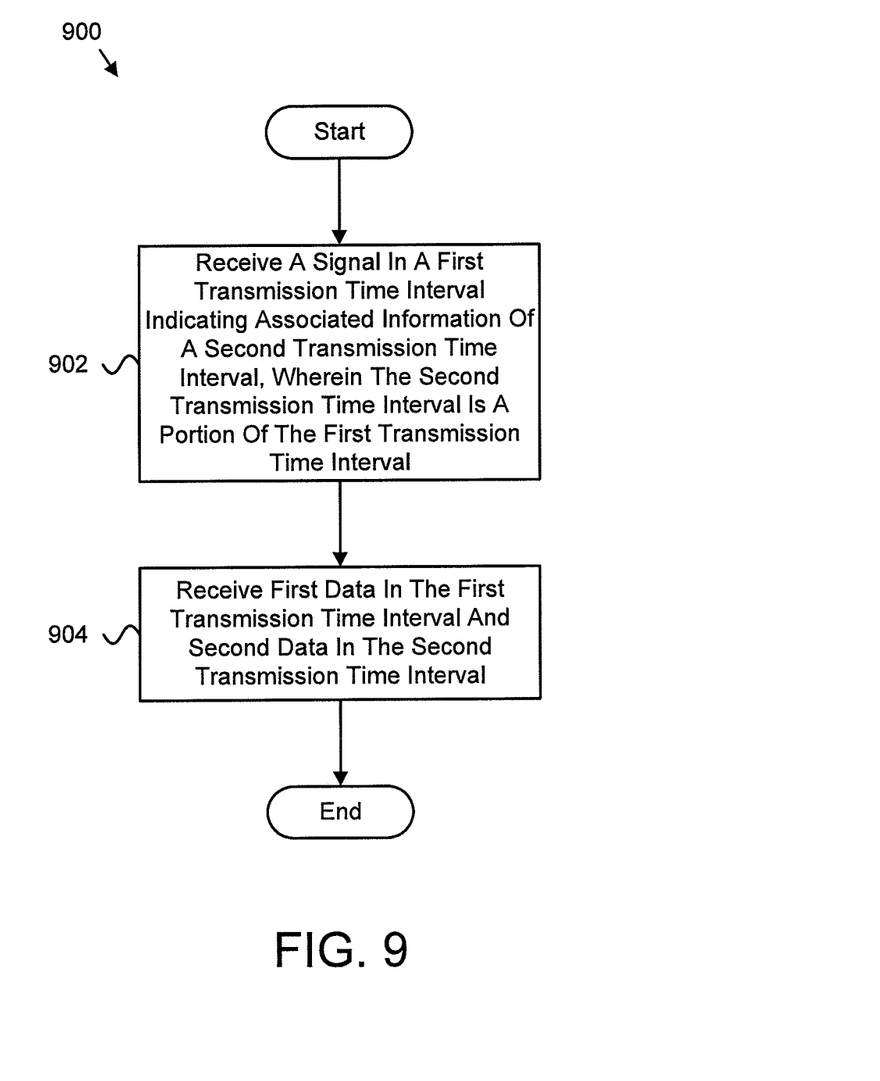
FIG. 9 is a schematic flow chart diagram illustrating one embodiment of a method for receiving an indication of a portion of a time interval.

FIG. 9 is a schematic flow chart diagram illustrating one embodiment of a method 900 for receiving an indication of a portion of a time interval. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902 a signal in a first transmission time interval indicating associated information of a second transmission time interval, wherein the second transmission time interval is a portion of the first transmission time interval. In certain embodiments, the method 900 includes receiving 904 first data in the first transmission time interval and second data in the second transmission time interval.

In one embodiment, the method 900 includes receiving a first control channel in the first transmission time interval for indicating associated information for the first data and a second control channel in the second transmission time interval for indicating associated information for the second data. In a further embodiment, the method 900 includes receiving a control channel in the first transmission time interval for indicating associated information for the first data and the second data. In certain embodiments, the first data is a partial retransmission of a previous transmission and the second data is a new transmission. In various embodiments, the first data is a new transmission and the second data is a partial retransmission of a previous transmission. In some embodiments, the signal is included in a control channel in a beginning of the first transmission time interval. In one embodiment, the signal is included in a control channel for indicating associated information for the first data.

In certain embodiments, the signal indicates a starting position of the second transmission time interval. In some embodiments, the signal includes multiple bits that indicate a starting symbol of the second transmission time interval. In one embodiment, the signal includes a bitmap to indicates the starting symbol of the second transmission time interval. In various embodiments, the signal indicates an aggregation level, a number of blind decoding candidates for each aggregation level, a set of control channel elements for each aggregation level, a time duration of a region comprising the second control channel, a control resource set index, a starting control channel element index, a starting resource element group index, a numerology, or some combination thereof for detection of a second control channel in the second transmission time interval for indicating associated information for the second data.

Figure 10:
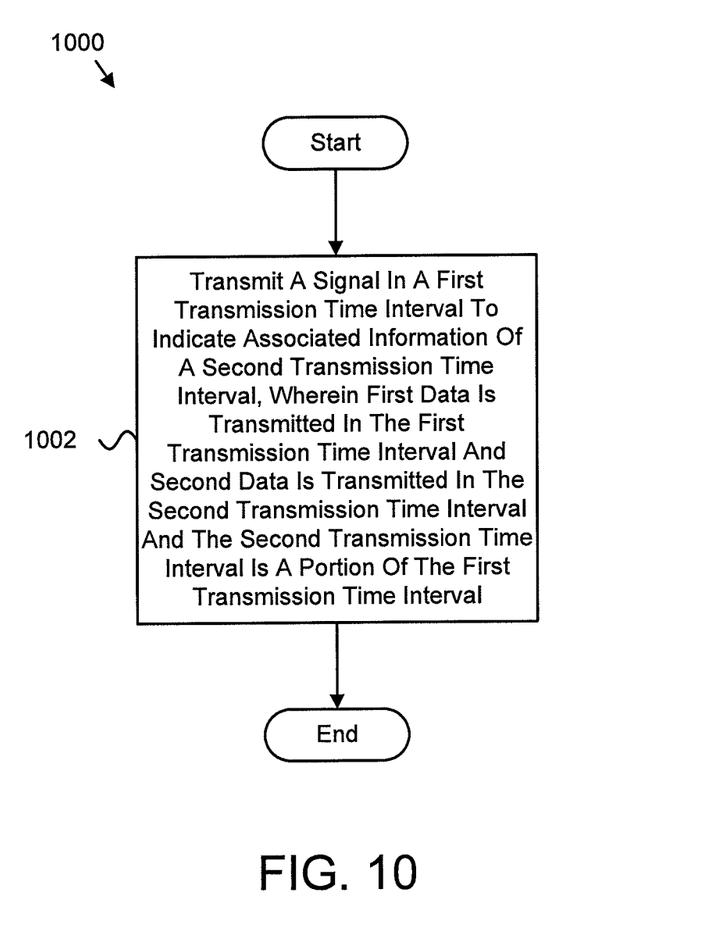
FIG. 10 is a schematic flow chart diagram illustrating one embodiment of a method for transmitting an indication of a portion of a time interval.

FIG. 10 is a schematic flow chart diagram illustrating one embodiment of a method 1000 for transmitting an indication of a portion of a time interval. In some embodiments, the method 1000 is performed by an apparatus, such as the base unit 104. In certain embodiments, the method 1000 may be performed by a processor executing program code, for example, a microcontroller, a microprocessor, a CPU, a GPU, an auxiliary processing unit, a FPGA, or the like.

The method 1000 may include transmitting 1002 a signal in a first transmission time interval to indicate associated information of a second transmission time interval, wherein first data is transmitted in the first transmission time interval and second data is transmitted in the second transmission time interval and the second transmission time interval is a portion of the first transmission time interval.

In one embodiment, the first transmission time interval includes a first control channel for indicating associated information for the first data and the second transmission time interval includes a second control channel for indicating associated information for the second data. In a further embodiment, the first transmission time interval includes a control channel for indicating associated information for the first data transmission and the second data transmission. In certain embodiments, the first data and the second data are transmitted to a same receiver. In some embodiments, the first data is a partial retransmission of a previous transmission and the second data is a new transmission. In one embodiment, the first data is a new transmission and the second data is a partial retransmission of a previous transmission.

In some embodiments, the signal is included in a control channel in a beginning of the first transmission time interval. In certain embodiments, the signal is included in a control channel for indicating associated information for the first data. In various embodiments, the signal indicates a starting position of the second transmission time interval. In one embodiment, the signal includes multiple bits that indicate a starting symbol of the second transmission time interval. In some embodiments, the signal includes a bitmap to indicates the starting symbol of the second transmission time interval. In certain embodiments, the signal indicates an aggregation level, a number of blind decoding candidates for each aggregation level, a set of control channel elements for each aggregation level, a time duration of a region comprising the second control channel, a control resource set index, a starting control channel element index, a starting resource element group index, a numerology, or some combination Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a receiver that:
receives a first physical downlink control channel transmission in a first transmission time interval indicating:
a first location of first data in the first transmission time interval; and
a second location of a second physical downlink control channel transmission in a second transmission time interval, wherein the second transmission time interval is a portion of the first transmission time interval, the second physical downlink control channel transmission indicates a third location of second data, the second transmission time interval carries the second data, and the indication of the second location of the second physical downlink control channel transmission occurs before the first data is received; and
receives the first data in the first location of the first transmission time interval and the second data in the third location of the second transmission time interval.

2. The apparatus of claim 1, wherein the receiver further receives a first control channel in the first transmission time interval for indicating associated information for the first data and a second control channel in the second transmission time interval for indicating associated information for the second data.

3. The apparatus of claim 1, wherein the receiver further receives a control channel in the first transmission time interval for indicating associated information for the first data and the second data.

4. A method comprising:
receiving a first physical downlink control channel transmission in a first transmission time interval indicating:
a first location of first data in the first transmission time interval; and
a second location of a second physical downlink control channel transmission in a second transmission time interval, wherein the second transmission time interval is a portion of the first transmission time interval, the second physical downlink control channel transmission indicates a third location of second data, the second transmission time interval carries the second data, and the indication of the second location of the second physical downlink control channel transmission occurs before the first data is received; and
receiving the first data in the first location of the first transmission time interval and the second data in the third location of the second transmission time interval.

5. The method of claim 4, wherein the first data is a partial retransmission of a previous transmission and the second data is a new transmission.

6. The method of claim 4, wherein the first data is a new transmission and the second data is a partial retransmission of a previous transmission thereof for detection of a second control channel in the second transmission time interval for the second data.

7. The method of claim 4, wherein the first physical downlink control channel transmission is included in a control channel in a beginning of the first transmission time interval.

8. The method of claim 4, wherein the first physical downlink control channel transmission is included in a control channel for indicating associated information for the first data.

9. The method of claim 4, wherein the first physical downlink control channel transmission indicates a starting position of the second transmission time interval.

10. The method of claim 4, wherein the first physical downlink control channel transmission comprises a plurality of bits that indicate a starting symbol of the second transmission time interval.

11. The method of claim 4, wherein the first physical downlink control channel transmission comprises a bitmap to indicates the starting symbol of the second transmission time interval.

12. The method of claim 4, wherein the first physical downlink control channel transmission indicates an aggregation level, a number of blind decoding candidates for each aggregation level, a set of control channel elements for each aggregation level, a time duration of a region comprising the second control channel, a control resource set index, a starting control channel element index, a starting resource element group index, a numerology, or some combination thereof for detection of a second control channel in the second transmission time interval for indicating associated information for the second data.

13. An apparatus comprising:
a transmitter that transmits a first physical downlink control channel transmission in a first transmission time interval to indicate:
a first location of first data in the first transmission time interval; and
a second location of a second physical downlink control channel transmission in a second transmission time interval, wherein the first data is transmitted in the first transmission time interval and second data is transmitted in the second transmission time interval, the second transmission time interval is a portion of the first transmission time interval, and the second physical downlink control channel transmission indicates a third location of the second data, the second transmission time interval carries the second data, and the indication of the second location of the second physical downlink control channel transmission occurs before the first data is received.

14. A method comprising:
transmitting a first physical downlink control channel transmission in a first transmission time interval to indicate:
a first location of first data in the first transmission time interval; and
a second location of a second physical downlink control channel transmission in a second transmission time interval, wherein the first data is transmitted in the first transmission time interval and second data is transmitted in the second transmission time interval, the second transmission time interval is a portion of the first transmission time interval, and the second physical downlink control channel transmission indicates a third location of the second data, the second transmission time interval carries the second data, and the indication of the second location of the second physical downlink control channel transmission occurs before the first data is received.

15. The method of claim 14, wherein the first transmission time interval includes a first control channel for indicating associated information for the first data and the second transmission time interval includes a second control channel for indicating associated information for the second data.

16. The method of claim 14, wherein the first transmission time interval includes a control channel for indicating associated information for the first data transmission and the second data transmission.

17. The method of claim 14, wherein the first data and the second data are transmitted to a same receiver.

18. The method of claim 14, wherein the first data is a partial retransmission of a previous transmission and the second data is a new transmission.

19. The method of claim 14, wherein the first data is a new transmission and the second data is a partial retransmission of a previous transmission.

20. The method of claim 14, wherein the first physical downlink control channel transmission is included in a control channel in a beginning of the first transmission time interval.

* * * * *